United States Patent
Yu et al.

(10) Patent No.: US 8,847,987 B2
(45) Date of Patent: Sep. 30, 2014

(54) SYSTEM AND METHOD FOR CONTROLLING DEVICE

(75) Inventors: Yong-Ju Yu, Seoul (KR); Jin Park, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 256 days.

(21) Appl. No.: 13/297,532

(22) Filed: Nov. 16, 2011

(65) Prior Publication Data
US 2012/0120102 A1    May 17, 2012

(30) Foreign Application Priority Data
Nov. 17, 2010    (KR) .................... 10-2010-0114689

(51) Int. Cl.
*G09G 5/00*    (2006.01)

(52) U.S. Cl.
CPC ...................................... *G09G 5/00* (2013.01)
USPC ....................................................... 345/633

(58) Field of Classification Search
USPC ....................................................... 345/633
See application file for complete search history.

(56) References Cited

U.S. PATENT DOCUMENTS

| | | | |
|---|---|---|---|
| 7,224,903 B2 | 5/2007 | Colmenarez et al. | |
| 8,433,336 B2* | 4/2013 | Lee et al. | 455/456.1 |
| 8,610,771 B2* | 12/2013 | Leung et al. | 348/143 |
| 2009/0003662 A1* | 1/2009 | Joseph et al. | 382/118 |
| 2009/0102859 A1* | 4/2009 | Athsani et al. | 345/619 |
| 2009/0216446 A1* | 8/2009 | Ma et al. | 701/213 |
| 2009/0298517 A1* | 12/2009 | Freer | 455/466 |
| 2011/0187744 A1* | 8/2011 | Kim et al. | 345/633 |
| 2011/0187745 A1* | 8/2011 | Kang et al. | 345/633 |
| 2011/0287811 A1* | 11/2011 | Mattila et al. | 455/566 |
| 2011/0300876 A1* | 12/2011 | Lee et al. | 455/456.1 |
| 2012/0122491 A1* | 5/2012 | Kim et al. | 455/456.3 |
| 2012/0195464 A1* | 8/2012 | Ahn | 382/103 |
| 2013/0116922 A1* | 5/2013 | Cai et al. | 701/515 |

* cited by examiner

*Primary Examiner* — M Good Johnson
(74) *Attorney, Agent, or Firm* — Cha & Reiter, LLC (57) ABSTRACT

Provided is a system and method for controlling a device using Augmented Reality (AR). A system for controlling a device using Augmented Reality (AR) includes a device server, an AR server, and a portable terminal. The device server registers information about each device. The AR server generates an AR screen displaying type information and service-related information of at least one device searched in response to a request of a portable terminal by using the registered device information, and provides the generated AR screen to the portable terminal. The portable terminal connects with a device selected among devices displayed on the AR screen and performs a specific function with the connected device.

19 Claims, 4 Drawing Sheets

| ALTITUDE (M) | FLOOR |
|---|---|
| 5~10 | 1 |
| 10~15 | 2 |
| 15~20 | 3 |

+

| GPS | FLOOR |
|---|---|
| 35.195xxa, 129.294xxaa~ 35.195xxb, 129.294xxb~ | Room1 |
| 35.195xxc, 129.294xxc~ 35.195xxd, 129.294xxd~ | Room2 |
| ... | Room3 |

SYSTEM AND METHOD FOR CONTROLLING DEVICE

CLAIM OF PRIORITY

This application claims the benefit under 35 U.S.C. §119 (a) of a Korean Patent Application filed in the Korean Intellectual Property Office on Nov. 17, 2010 and assigned Serial No. 10-2010-0114689, the entire disclosure of which is hereby incorporated by reference.

BACKGROUND OF THE INVENTION

1. Field of the Invention

The present invention relates generally to a system and method for controlling devices, and more particularly, to a system and method for controlling devices using Augmented Reality (AR).

2. Description of the Related Art

Commonly, in displaying accessible devices around the current location, a portable terminal controlling the devices simply arranges icons of the searched devices on its display unit.

However, the simple arrangement of icons cannot inform a user of the portable terminal of the types, available services, and actual locations of the searched devices.

One plausible may be, if a user of a portable terminal photographs the devices, the portable terminal can recognize the shapes of the photographed devices and provides information about the recognized devices to the user on its display unit.

In this case, however, the user may be inconvenienced by having to photograph the devices one by one. Also, if the portable terminal fails to recognize the shape of a certain photographed device, the user must inconveniently re-photograph the device. If there is no information about the photographed device, it is impossible to control the photographed device.

SUMMARY OF THE INVENTION

An exemplary embodiment of the present invention is to provide a device control system and method for displaying type information and service-related information of searched accessible devices using Augmented Reality (AR).

Another exemplary embodiment of the present invention is to provide a device control system and method capable of connecting with a device selected among the devices displayed using AR, and performing a certain function with the connected device.

According to an aspect of the present invention, a system for controlling a device using Augmented Reality (AR) includes: a device server for registering information about each device; a AR server for generating an AR screen displaying device type information and service-related information of at least one device searched in response to a request of a portable terminal based on the registered device information, and providing the generated AR screen to the portable terminal; and the portable terminal for connecting with a device selected among devices displayed on the AR screen and performing a specific function with the connected device.

According to another aspect of the present invention, a method for controlling a device using Augmented Reality (AR) includes: registering information about each device in a device server; generating, by an AR server, an AR screen displaying device type information and service-related information of at least one device searched at a request of a portable terminal, and transmitting the generated AR screen to the portable terminal; and connecting, by the portable terminal, with a device selected among devices displayed on the AR screen and performing a specific function with the connected device.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Exemplary embodiments of the present invention will be described below in detail with reference to the accompanying drawings. Like reference numerals in the drawings denote like elements. The present invention may, however, be embodied in different forms and should not be construed as limited to the embodiments set forth herein; rather, these embodiments are provided so that this disclosure will be thorough and complete, and will fully convey the scope of the present invention to those skilled in the art.

Figure 1:
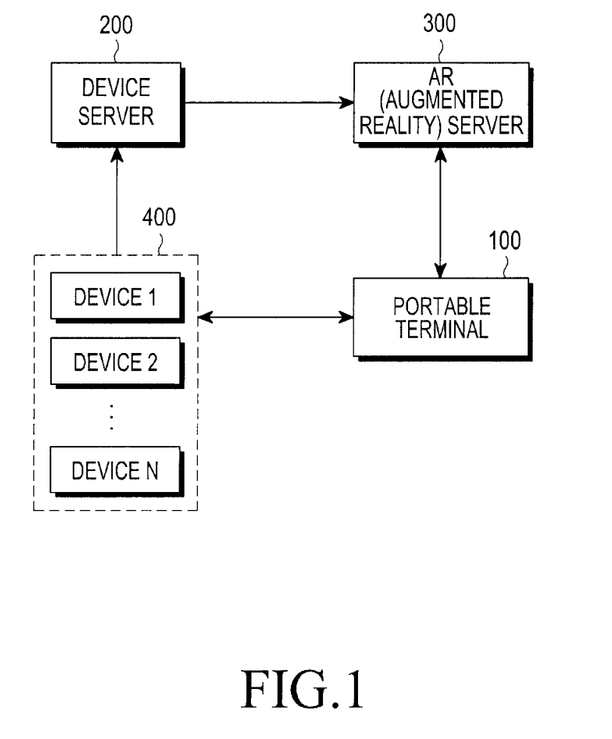
FIG. 1 is a block diagram of a device control system according to an exemplary embodiment of the present invention.

FIG. 1 is a block diagram of a device control system according to an exemplary embodiment of the present invention.

Referring to FIG. 1, a device control system according to an exemplary embodiment of the present invention includes a device server 200, an Augmented Reality (AR) server 300, and a portable terminal 100. The device server 200 registers information about each device. The AR server 300 provides an AR screen displaying information about each device and the type of each device. The portable terminal 100 connects with a device selected among the devices displayed on the AR screen.

The device server 200 registers information about each device 400 (hereinafter also referred to as device information). Herein, the device information may include Identification (ID), Location Information, Available Service, Visual Database (DB), Access Right, and Connection Medium.

The device server 200 registers the device information in the following process. When the device does not have a Global Positioning System (GPS) or an altitude sensor, a user of the device may use an external device (e.g., a Personal Computer (PC)) to access the device server 200 in registering the device information. Herein, the user may use a separate map to designate and register current location information of the device in a more detailed manner. In an exemplary embodiment, the device may be a fixed printer or router.

Meanwhile, the user may use his own portable terminal with a GPS and an altitude sensor to access the device server 200 in registering the device information. In this case, detailed location information of the portable terminal obtained through the GPS and the altitude sensor of the portable terminal may be registered as the location information of the device.

The device server 200 transmits the registered device information to the AR server 300. The device information registered in the device server 200 is updated automatically, or by the user periodically or whenever a change occurs in the device information, and the device server 200 transmits update information of the device to the AR server 300.

The AR server 300 registers the device information received from the device server 200, and updates the device information according to the update information received from the device server 200.

The AR server 300 may have a separate location table storing only the location information among the device information. The location table stores detailed location information of the device. For example, if the device is fixedly located in a building, the location table may store an altitude sensor value of each floor and a GPS value of each room of each floor.

Figure 2A:
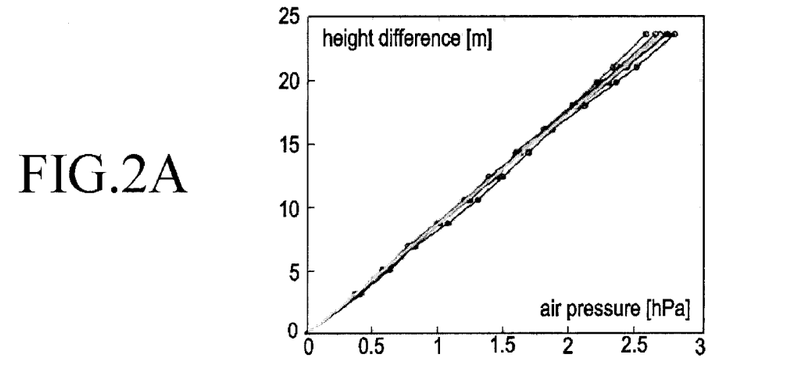
FIG. 2 is a diagram illustrating a location table according to an exemplary embodiment of the present invention.
Figure 2B:
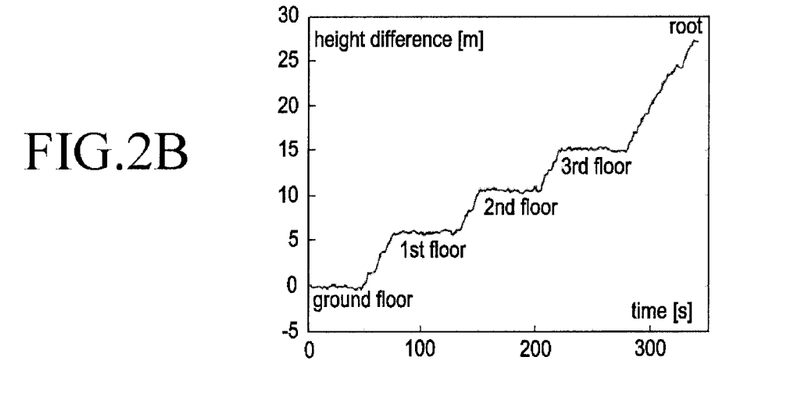
Figure 2C:
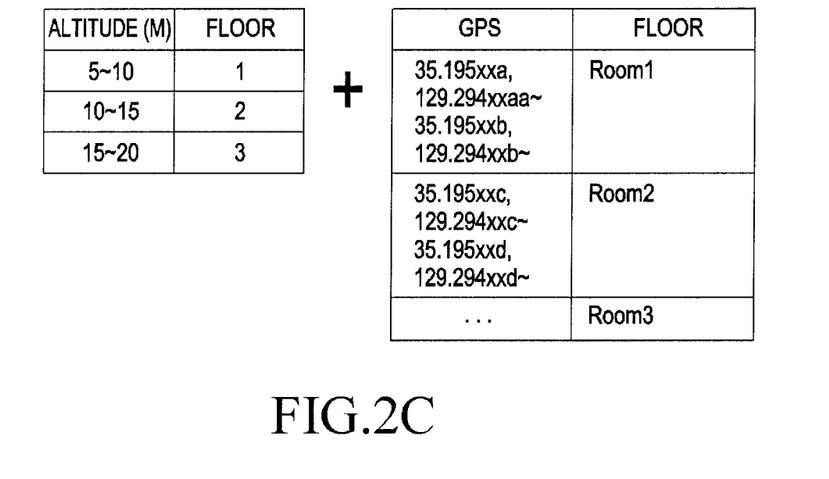

FIG. 2 is a diagram illustrating an example of the location table according to the present invention. In particular, FIG. 2A is a graph illustrating measuring altitudes by atmospheric pressures, and FIG. 2B is a graph illustrating extracting floor information from the measured atmospheric pressures. FIG. 2C illustrates a table representing each floor by an altitude sensor value and a table representing each room by a GPS value. The location table can be extracted from a combination of the two tables.

The location table may be stored in a separate server, which may be a server covering the region where the device is located.

Upon receiving an AR-based device search request from the portable terminal 100, the AR server 300 searches the location table for the device located within a predetermined range from the current location of the portable terminal 100, on the basis of the location information of the portable terminal 100 received together with the device search request.

The AR server 300 extracts Visual DB (external shape information) from the searched-device information, displays Device Type by the Visual DB, generates an AR screen displaying service-related information of the searched device together with the Device Type, and transmits the related information on the AR screen to the portable terminal 100. The device information includes Available Service, Access Right, and Connection Medium.

Because the location information received from the portable terminal includes a GPS value and an altitude sensor value, the AR server 300 can display the actual location of the device searched on the AR screen.

The portable terminal 100 transmits an AR-based device search request to the AR server 300 in response to a request of the user, and displays the AR screen received accordingly. When the user selects a device from the AR screen on the portable terminal displaying the device information and the Device Type displayed by the Visual DB, the portable terminal 100 directly connects with the selected device to perform a relevant function.

The relevant function may be Contents Share, Playback, Display, Projection, Audio, Printing, Game, or Device-Specific Service, depending on the type of the connected device. A detailed configuration of the portable terminal 100 will be described below with reference to FIG. 3.

Figure 3:
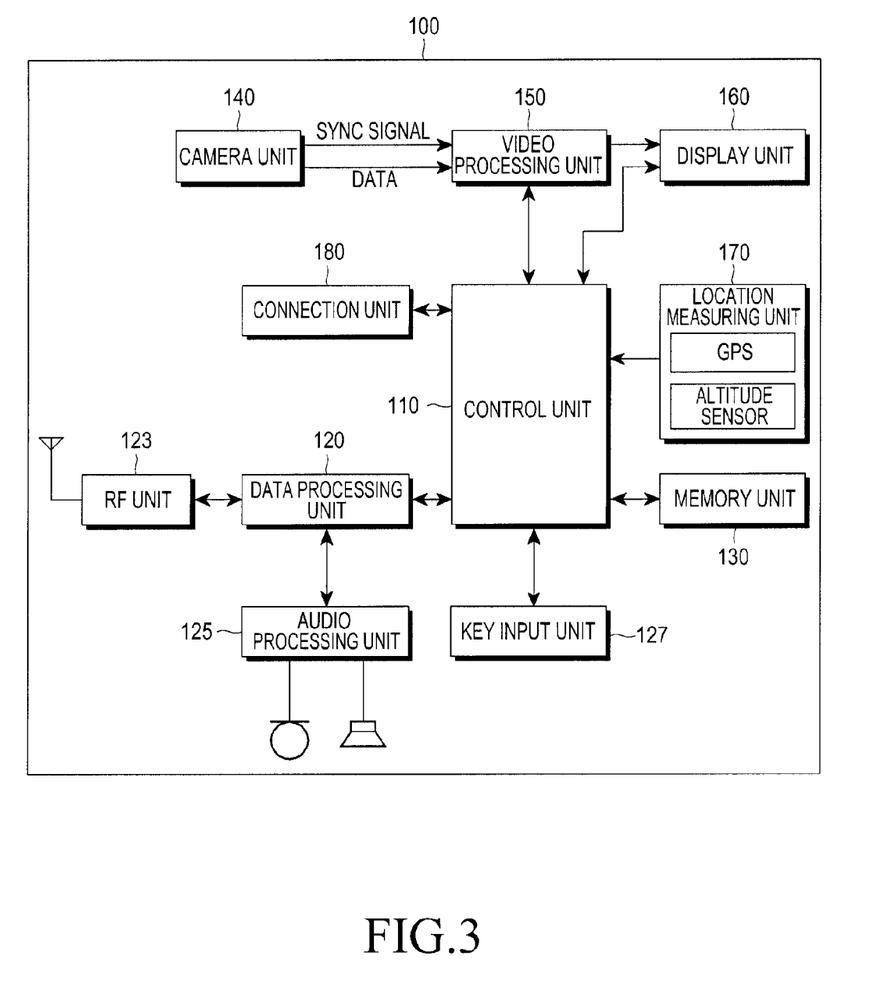
FIG. 3 is a block diagram of the portable terminal shown in FIG. 1 according to an exemplary embodiment of the present invention.

FIG. 3 is a block diagram of the portable terminal 100 according to an exemplary embodiment of the present invention.

Referring to FIG. 3, the portable terminal 100 includes a control unit 110, a data processing unit 120, a Radio Frequency (RF) unit 123, an audio processing unit 125, a key input unit 127, a memory unit 130, a camera unit 140, a video processing unit 150, a display unit 160, a location measuring unit 170, and a connection unit 180.

In operation, the RF unit 123 performs a wireless communication function of the portable terminal 100. The RF unit 123 includes an RF transmitter for upconverting and amplifying a transmission (TX) signal, and an RF receiver for low-noise-amplifying and downconverting a received (RX) signal. The data processing unit 120 includes a transmitter for encoding and modulating the TX signal, and a receiver for demodulating and decoding the RX signal. For example, the data processing unit 120 includes a modem and a codec. The codec includes a data codec for processing packet data, and an audio codec for processing audio signals (e.g., voice signals). The audio processing unit 125 processes an RX audio signal outputted from the audio codec of the data processing unit 120, and transmits a TX audio signal picked up by a microphone to the audio codec of the data processing unit 120.

The key input unit 127 includes keys for inputting numeral and character information, and function keys for setting various functions.

The memory unit 130 may include a program memory and a data memory. The program memory may store programs for controlling a general operation of the portable terminal 100.

The control unit 110 controls an overall operation of the portable terminal 100.

According to an exemplary embodiment, the control unit 110 transmits an AR-based device search request and the current location of the portable terminal, received from the location measuring unit 170, to the AR server 300 t a request of the user.

Upon receiving information relating to an AR screen from the AR server 300 in response to the request, the control unit 110 controls the display unit 160 to display an AR screen, which displays device information and Device Type.

According to an exemplary embodiment, when a device is selected on the AR screen on the portable terminal displaying the device information and the Device Type, the control unit 110 connects with the selected device through the connection unit 180 to perform a relevant function.

The location measuring unit 170 includes a GPS and an altitude sensor and measures the location of the portable terminal.

The connection unit 180 connects the portable terminal 100 to an external device. The connection unit 180 may include a wireless connection (e.g., Infrared or Bluetooth) and/or a wired connection (e.g., cable).

According to an exemplary embodiment, the connection unit 180 connects with a connection medium of a device selected on the AR screen.

The camera unit 140 includes a camera sensor for capturing video data and converting the video data into an electrical signal, and a signal processing unit for converting an analog video signal, captured by the camera sensor, into digital data. The camera sensor may include a CCD sensor or a CMOS sensor, and the signal processing unit may include a Digital Signal Processor (DSP). The camera sensor and the signal processing unit may be integrated into one unit, or may be separated from each other.

The video processing unit 150 performs an Image Signal Processing (ISP) operation to display video signals, outputted from the camera unit 140, on the display unit 160. Examples of the ISP operation include gamma correction, interpolation, spatial change, image effects, image scaling, Automatic White Balance (AWB), Automatic Exposure (AE), and Automatic Focus (AF). The video processing unit 150 processes the video signals, outputted from the camera unit 140, on a frame basis, and outputs the frame video data according to the size and characteristics of the display unit 160. The video processing unit 150 includes a video codec to compress the frame video data displayed on the display unit 160 and restore the compressed frame video data into the original frame video data. The video codec may include a JPEG codec, an MPEG4 codec, or a Wavelet codec. The video processing unit 150 may have an On-Screen Display (OSD) function to output OSD data in accordance with a display screen size under the control of the control unit 110.

The display unit 160 displays the video signal outputted from the video processing unit 150, and displays the user data outputted from the control unit 110. The display unit 160 may be implemented using an LCD. If the display unit 160 is implemented using an LCD, the display unit 160 may include an LCD panel, an LCD controller, and a memory for storing video data. The LCD may be a touchscreen LCD. If the LCD is a touchscreen LCD, it may also operate as an input unit. The display unit 160 may display the keys of the key input unit 127.

According to an exemplary embodiment, the display unit 160 displays an AR screen to display information about each device and the type of each device.

A device control operation of the device control system according to an exemplary embodiment of the present invention will be described below in detail with reference to FIGS. 1 to 4.

Referring to FIGS. 1 to 4, in step 401, the user registers information about each device in the device server 200. Herein, the device information includes Identification (ID), Location Information, Available Service, Visual DB, Access Right, and Connection Medium.

Figure 4:
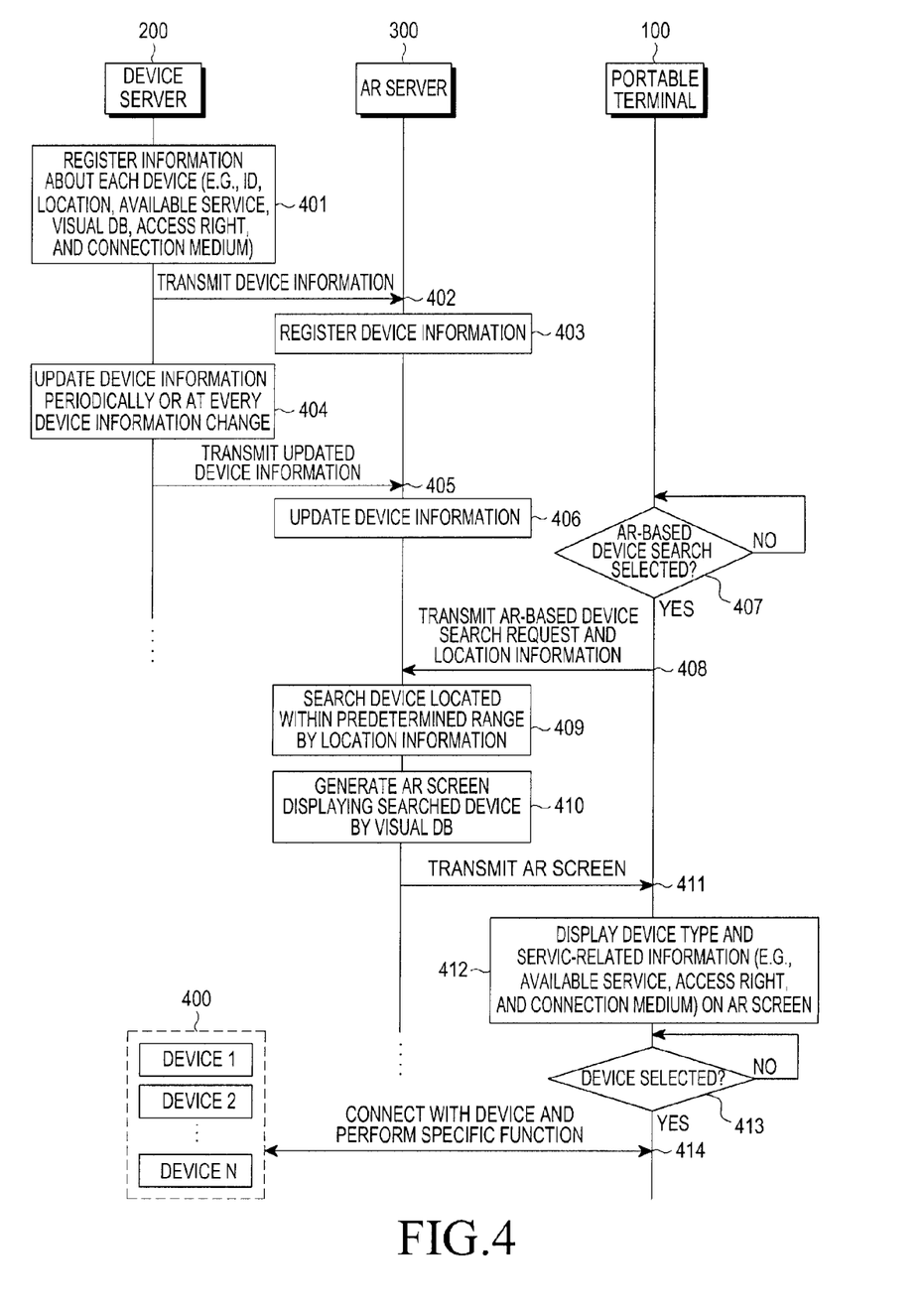
FIG. 4 is a flow diagram illustrating a device control operation of a device control system according to an exemplary embodiment of the present invention.

In step 402, the device server 200 transmits the registered device information to the AR server 300.

In step 403, the AR server 300 registers the device information received from the device server 200.

If the device information registered in the device server 200 is updated automatically, or by the user periodically or whenever a change in the device information occurs, the device server 200 updates the device information in step 404. The device information change includes a device movement and a use right change.

In step 405, the device server 200 transmits the device update information to the AR server 300. In step 406, the AR server 300 updates the device information.

In step 407, the control unit 110 of the portable terminal 100 determines whether an AR-based device search function is selected by the user during the above process. If the AR-based device search function is selected, the control unit 110 proceeds to step 408. In step 408, the control unit 110 transmits an AR-based device search request and location information of the portable terminal to the AR server 300.

In step 408, the control unit 110 transmits a GPS value and an altitude sensor value, measured by the location measuring unit 170 of the portable terminal, as the current location information of the portable terminal to the AR server 300.

Upon receiving the AR-based device search request and the location information of the portable terminal, the AR server 300 searches the location table for a device located within a predetermined range from the current location of the portable terminal. Note that the current location of the terminal is detected using its GPS unit.

When searching for a device located within a predetermined range from the current location of the portable terminal in step 409, the AR server 300 may primarily search for a device by the location value of the location table and may secondarily search for the device by the visual DB.

For example, if at least two devices are fixed together, when a device search is performed using the location value of the location table, the two devices may be searched as one device.

Thus, the ID of the device may be searched by the location value of the location table and then the visual DB representing the actual shape of the device corresponding to the searched device ID may be compared with the actual shape of the device to search for the two devices in a classified manner. The actual shape of the device may be captured by the camera unit 140 of the portable terminal for comparison.

When the AR-based device search function is selected by the user, the portable terminal 100 may drive the camera unit 140 to photograph the device available at the current location of the portable terminal and may transmit the photographed image of the device to the AR server 300.

In step 410, the AR server 300 extracts visual DB from information about each device searched in step 409, displays the device, extracts Available Service, Access Right and Connection Medium information from the information, and generates an AR screen displaying the extracted information together with the visual DB of the device.

In step 411, the AR server 300 transmits the generated AR screen to the portable terminal 100. In step 412, the control unit 110 of the portable terminal displays the received AR screen on the display unit 160 of the portable terminal.

In step 412, an image similar to the actual shape of the device located within a predetermined range from the current location of the portable terminal is displayed and located on the AR screen displayed by the display unit 160, and device information (e.g., Available Service, Access Right, and Connection Information) is displayed together with the image of the device.

Thus, the user of the portable terminal can easily recognize the type of the device from the AR screen, and can easily recognize service-related information of the device from the device information.

Because each device is displayed on the AR screen at a screen location corresponding to its actual location with respect to the location of the portable terminal, the user of the portable terminal can easily recognize the current location of the device from the AR screen.

In step 413, the control unit 110 determines whether a device is selected by the user from the AR screen displayed in step 412. If a device is selected by the user from the AR screen, the control unit 110 proceeds to step 414. In step 414, the control unit 110 connects with the selected device through the connection unit 180 of the portable terminal.

In step 414, the control unit 110 of the portable terminal transmits a connection request to the selected device located with a predetermined range, connects with the selected device, and performs a relevant function through a service provided by the selected device.

Each device displayed on the AR screen in step 412 displays its own Service, Access Right and Connection Medium information. Therefore, if the user provides a printer service, has a Bluetooth connection medium, and selects a device accessible to all, the portable terminal may connect with the device by Bluetooth to perform a printer function in step 414.

If the portable terminal needs to install a driver to perform a relevant function with the device, the AR server 300 may automatically install the driver in the portable terminal 100 after the portable terminal 100 connects with the device.

The relevant function may be Contents Share, Playback, Display, Projection, Audio, Printing, Game, or Device-Specific Service, depending on the type of the connected device.

As is apparent from the foregoing description, the device control system and method according to the present invention may ensure intuitive and simple device search and device selection/connection using the AR. In addition, service-related information of devices may be displayed on the AR screen, enabling the user to easily recognize the device information. Besides, the portable terminal may directly connect with a device selected on the AR screen and perform a specific function with the connected device.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A system for controlling a device using Augmented Reality (AR), comprising:
    an AR server for
        registering a plurality of device information corresponding to each of a plurality of devices,
        upon receiving location information from a portable terminal, searching at least one device located within a predetermined range based on the location information,
        generating an AR screen displaying a type of the at least one device searched using the plurality of device information registered, and
        transmitting the generated AR screen to the portable terminal; and
    the portable terminal for
    transmitting the location information of the portable terminal to the AR server, and
    displaying the AR screen received from the AR server.

2. The system of claim 1, wherein the registered device information includes Identification (ID), Location Information, Available Service, Visual Database (DB), Access Right, and Connection Medium.

3. The system of claim 2, wherein the location information is manually registered by a user or current location information of the portable terminal is registered as the location information, and
    wherein the registered location information is stored in a location table of the AR server.

4. The system of claim 1, wherein the location of the at least one of devices is displayed on the AR screen corresponds to an actual location of the at least one of devices.

5. The system of claim 1, further comprising;
    a device server for
    registering a plurality of device information corresponding to each of a plurality of devices,
    transmitting the plurality of device information registered to the AR server, the device information updated periodically or whenever the registered plurality of device information changes, to the AR server.

6. The system of claim 1, wherein the AR server registers the plurality of device information received from a device server, and updates the device information according to update information received from the device server.

7. The system of claim 1, wherein the AR server generates the AR screen displaying a device type and service-related information of the at least one device searched,
    wherein the device type is generated by a visual DB.

8. The system of claim 1, wherein the AR server is received an AR-based device search request together with the location information of the portable terminal from the portable terminal.

9. The system of claim 1, wherein the portable terminal displays a type of the at least one of device and service-related information about the at least one of each device on the AR screen received from the AR server in response to an AR-based device search request.

10. The system of claim 9, wherein the service-related information includes Available Service, Access Right, and Connection Medium.

11. A method for controlling a device using Augmented Reality (AR), comprising:
    registering, by an AR server, a plurality of device information corresponding to each of a plurality of devices,
    transmitting, by a portable terminal, location information of the portable terminal to the AR server,
    searching, by the AR server, at least one device located within a predetermined range based on the location information, generating, by the AR server, an AR screen displaying a type of the at least one device searched, using the plurality of device information registered upon receiving the location information from the portable terminal,
    transmitting by the AR server, the generated AR screen to the portable terminal; and
    displaying, by the portable terminal, the AR screen received from the AR server.

12. The method of claim 11, wherein the registered device information includes Identification (ID), Location Information, Available Service, Visual Database (DB), Access Right, and Connection Medium.

13. The method of claim 12, wherein the location information is manually registered by a user or current location information of the portable terminal is registered as the location information, and wherein the registered location information is stored in a location table of the AR server.

14. The method of claim 11, wherein the location of the at least one of device is displayed on the AR screen corresponds to an actual location of the at least one of devices.

15. The method of claim 11, further comprising:
    registering, by a device server, a plurality of device information corresponding to each of a plurality of devices,
    transmitting, by a device server, the plurality of device information registered to the AR server, and storing, by the AR server, the plurality of device information received; and
    transmitting, by a device server, device information, which is updated periodically or whenever the registered plurality of device information changes, to the AR server and updating, by the AR server, the device information.

16. The method of claim 11, wherein the generating of the AR screen comprises:
generating, by the AR server, the AR screen displaying a device type and service-related information of the at least one device searched,
wherein the device type is generated by a visual DB.

17. The method of claim 1, wherein the location information of the portable terminal is received from the portable terminal together with an AR-based device search request.

18. The method of claim 11, wherein the displaying the AR screen comprises:
displaying a type of the least one of device and serviced-related information about the at least one of device on the AR screen; and
connecting with a particular device selected among the at least one of devices displayed on the AR screen and performing a specific function with the connected particular device.

19. The method of claim 18, wherein the service-related information includes Available Service, Access Right, and Connection Medium.

* * * * *

UNITED STATES PATENT AND TRADEMARK OFFICE
CERTIFICATE OF CORRECTION

PATENT NO. : 8,847,987 B2  Page 1 of 1
APPLICATION NO. : 13/297532
DATED : September 30, 2014
INVENTOR(S) : Yong-Ju Yu et al.

It is certified that error appears in the above-identified patent and that said Letters Patent is hereby corrected as shown below:

In the Claims,

Column 7, Claim 4, Line 67 should read as follows: --...at least one device...--

Column 8, Claim 5, Lines 1-2 should read as follows: --...further comprising: a device...--

Column 8, Claim 9, Line 22 should read as follows: --...at least one device...--

Column 8, Claim 9, Line 23 should read as follows: --...at least one device...--

Column 8, Claim 11, Line 42 should read as follows: --...transmitting, by the AR server...--

Column 8, Claim 14, Line 56 should read as follows: --...least one device is...--

Column 8, Claim 14, Line 57 should read as follows: --...at least one device...--

Column 9, Claim 17, Line 9 should read as follows: --...The method of claim 11...--

Column 9, Claim 18, Line 14 should read as follows: --...the at least one device...--

Column 9, Claim 18, Lines 14-15 should read as follows: --...and service-related information...--

Column 9, Claim 18, Line 15 should read as follows: --...at least one device...--

Column 9, Claim 18, Line 18 should read as follows: --...least one device displayed...--

Signed and Sealed this
Sixth Day of January, 2015

Michelle K. Lee
*Deputy Director of the United States Patent and Trademark Office*